(12) United States Patent
Koide et al.

(10) Patent No.: US 6,354,829 B1
(45) Date of Patent: Mar. 12, 2002

(54) INJECTION APPARATUS SUPPORT MECHANISM FOR AN INJECTION MOLDING MACHINE

(75) Inventors: Atsushi Koide; Koichi Matubayashi, both of Nagano (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 0 days.

(21) Appl. No.: 09/421,523

(22) Filed: Oct. 20, 1999

(30) Foreign Application Priority Data

Oct. 20, 1998 (JP) .......................... 10-298081

(51) Int. Cl.[7] .......................................... B29C 045/02
(52) U.S. Cl. ...................... 425/557; 425/574; 425/587
(58) Field of Search ............................ 425/557, 574, 425/585, 586, 587, DIG. 243, 542, 558, 561

(56) References Cited

U.S. PATENT DOCUMENTS

| | | | | |
|---|---|---|---|---|
| 2,627,630 A | * | 2/1953 | Farley ........................ | 425/586 |
| 3,596,326 A | * | 8/1971 | Annis, Jr. ................ | 425/192 R |
| 4,540,359 A | * | 9/1985 | Yamazaki ................ | 425/135 |
| 4,988,273 A | * | 1/1991 | Faig et al. ................ | 425/145 |
| 5,380,186 A | * | 1/1995 | Hettinga ...................... | 425/557 |

FOREIGN PATENT DOCUMENTS

JP     A9-109221     4/1997

* cited by examiner

Primary Examiner—Nam Nguyen
Assistant Examiner—Joseph S Del Sole
(74) Attorney, Agent, or Firm—Birch, Stewart, Kolasch & Birch, LLP.

(57) ABSTRACT

An injection molding machine is equipped with an injection apparatus support mechanism comprising paired main tie-bars disposed to extend between a mold attachment plate and a back plate disposed to face each other; front and rear support plates connected to each other via paired auxiliary tie-bars and slidably supported by the main tie-bars; and an intermediate support block slidably supported by the main and auxiliary tie-bars. Since the mold attachment plate and the back plate are supported by the paired main tie-bars disposed symmetrically with respect to the screw, a sufficient level of mechanical strength (fixation strength) is secured for the mold attachment plate and the back plate. In addition, since the front support plate and the rear support plate are connected to each other by the paired auxiliary tie-bars disposed symmetrically with respect to the screw at positions different from those of the main tie-bars, the mechanical strength of these plates is secured.

7 Claims, 4 Drawing Sheets

INJECTION APPARATUS SUPPORT MECHANISM FOR AN INJECTION MOLDING MACHINE

BACKGROUND OF THE INVENTION

1. Field of the Invention

The present invention relates to an injection molding machine in which melted resin is injected from an injection apparatus and charged into a mold in order to mold a product.

2. Description of the Related Art

The basic configuration of a conventional inline-screw-type injection molding machine is disclosed in, for example, Japanese Patent Application Laid-Open (kokai) No. 9(1997)-109221. In such an injection molding machine, a mold clamping apparatus is disposed on one side of an upper surface of a machine base, and an injection apparatus is disposed on the other side of the upper surface of the machine base via an injection-apparatus reciprocation drive section. For a nozzle touch operation, the injection apparatus is advanced by the injection-apparatus reciprocation drive section, so that the tip end of an injection nozzle is brought into pressing contact with a mold (stationary mold) fixed to a mold attachment plate (stationary plate). For a nozzle release operation, the injection apparatus is retracted by the injection-apparatus reciprocation drive section, so that the tip end of the injection nozzle is separated from the mold.

Incidentally, since resin of high pressure is charged into the cavity of the mold, for the nozzle touch operation, a predetermined pushing force must be applied to the injection nozzle in order to bring the injection nozzle into pressing contact with the mold (stationary mold) supported by the mold attachment plate. In the conventional injection molding machine, the bottom portions of the mold attachment plate and the injection apparatus are fixed to or supported by the upper surface of the machine base, and when a large pushing force is applied horizontally to the mold attachment plate and the injection apparatus, the mold attachment plate and the injection-apparatus reciprocation drive section are subjected to excessive stresses, resulting in inclination of the mold attachment plate and/or the injection apparatus, a decrease in durability, occurrence of a malfunction, and additional cost for securing mechanical strength.

SUMMARY OF THE INVENTION

An object of the present invention is to provide an injection molding machine whose mechanical strength (fixation strength) has been increased greatly in order to prevent inclination of a mold attachment plate and/or an injection apparatus to thereby improve durability and prevent occurrence of a malfunction.

Another object of the present invention is to provide an injection molding machine employing tie-bars which provide various functions in order to reduce cost and to eliminate an additional cost which would otherwise be required to secure a sufficient mechanical strength of a mechanism for fixing or supporting the mold attachment plate and the injection apparatus.

To achieve the above objects, the present invention provides an injection molding machine which is equipped with an injection apparatus support mechanism comprising at least one main tie-bar disposed to extend between a mold attachment plate and a back plate disposed to face each other; front and rear support plates connected to each other via at least one auxiliary tie-bar and slidably supported by the main tie-bar; and an intermediate support block slidably supported by the main and auxiliary tie-bars, and in which a barrel is provided on the front support plate; a screw rotation drive section for rotating a screw inserted into the barrel is provided on the intermediate support block; a screw reciprocation drive section for advancing and retracting the screw rotation drive section is provided on the rear support plate; and an injection-apparatus reciprocation drive section for advancing and retracting the rear support plate is provided on the back plate.

Since the mold attachment plate and the back plate are supported by the main tie-bar, preferably a pair of the main tie-bars disposed symmetrically with respect to the screw, a sufficient level of mechanical strength (fixation strength) is secured for the mold attachment plate and the back plate. In addition, since the front support plate and the rear support plate are connected to each other by the auxiliary tie-bar, preferably, a pair of the auxiliary tie-bars disposed symmetrically with respect to the screw at positions different from those of the main tie-bars, the mechanical strength of these plates is secured. In this case, since the main tie-bar supports (guides) the front and rear support plates, the main tie-bar provides a support function and a guide function for the front and rear support plates. In addition, since the main and auxiliary tie-bars support (guide) the intermediate support block, the main and auxiliary tie-bars provide a support function and a guide function for the intermediate support block. Meanwhile, since the rear support plate is advanced and retracted by the injection-apparatus reciprocation drive section provided on the back plate, a reaction force generated during nozzle touch operation acts on the back plate in a direction perpendicular thereto, so that no excessive stresses act on the mold attachment plate and the injection apparatus.

DETAILED DESCRIPTION OF THE PREFERRED EMBODIMENT

An embodiment of the present invention will now be described in detail with reference to the drawings. The accompanying drawings are illustrative of the embodiments and are not meant to limit the scope of the invention. For clarification of the invention, detailed description of known parts is omitted.

First, the structure of an injection molding machine 1 according to the present embodiment will be described with reference to FIGS. 1–4.

Figure 1:
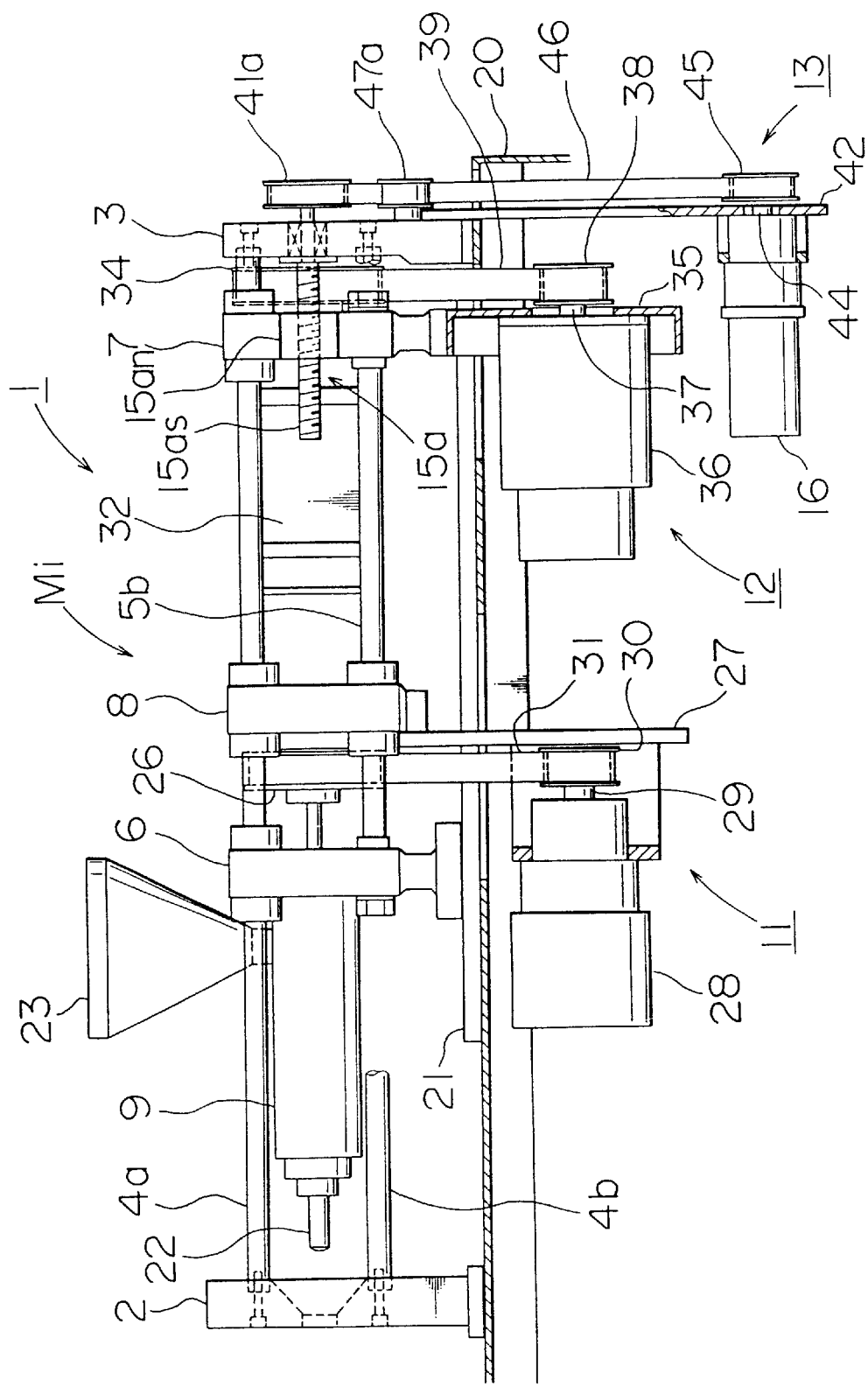
FIG. 1 is a partially sectioned side view of an injection molding machine according to an embodiment of the present invention.
Figure 2:
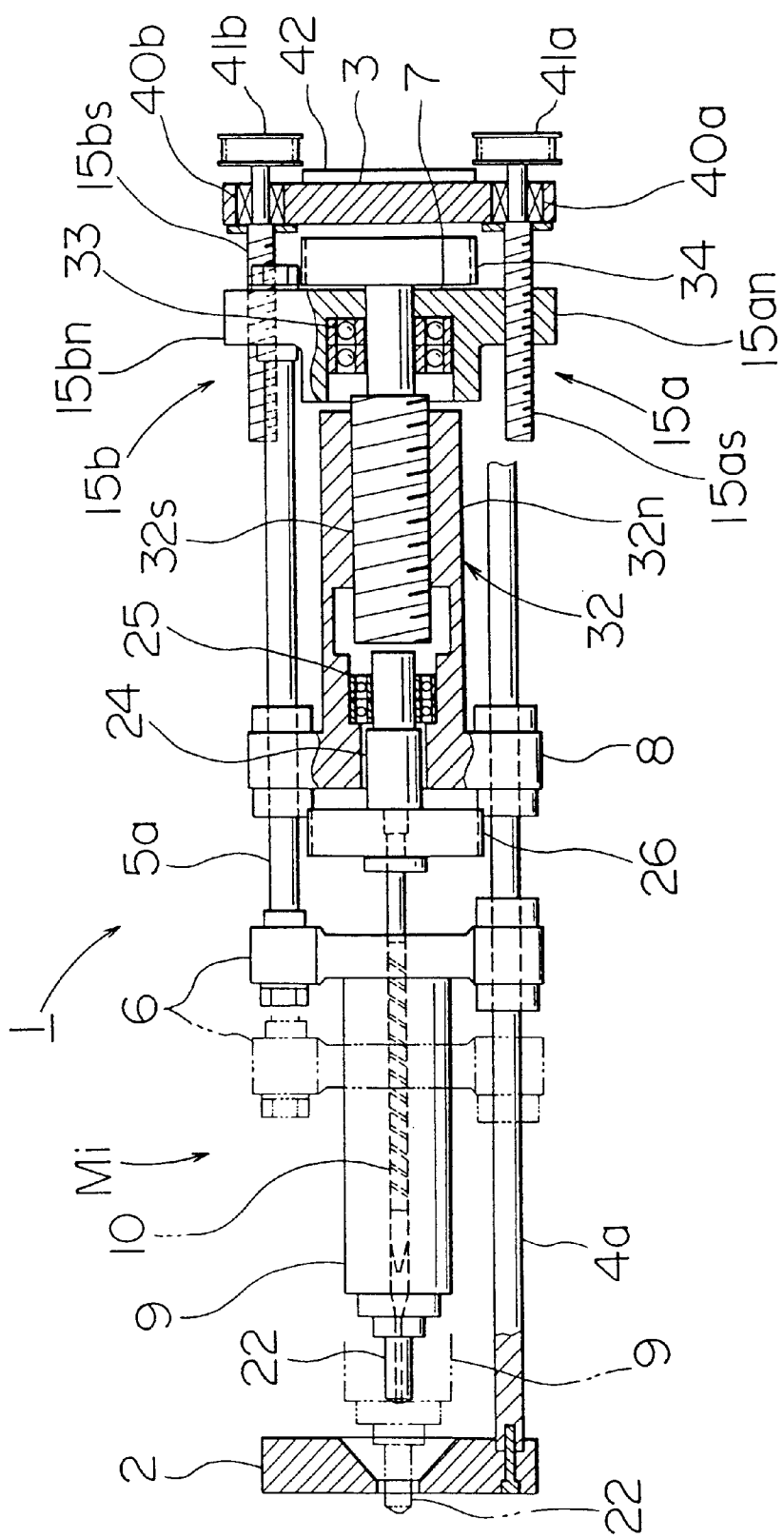
FIG. 2 is a partially sectioned plan view of the injection molding machine shown in FIG. 1.
Figure 3:
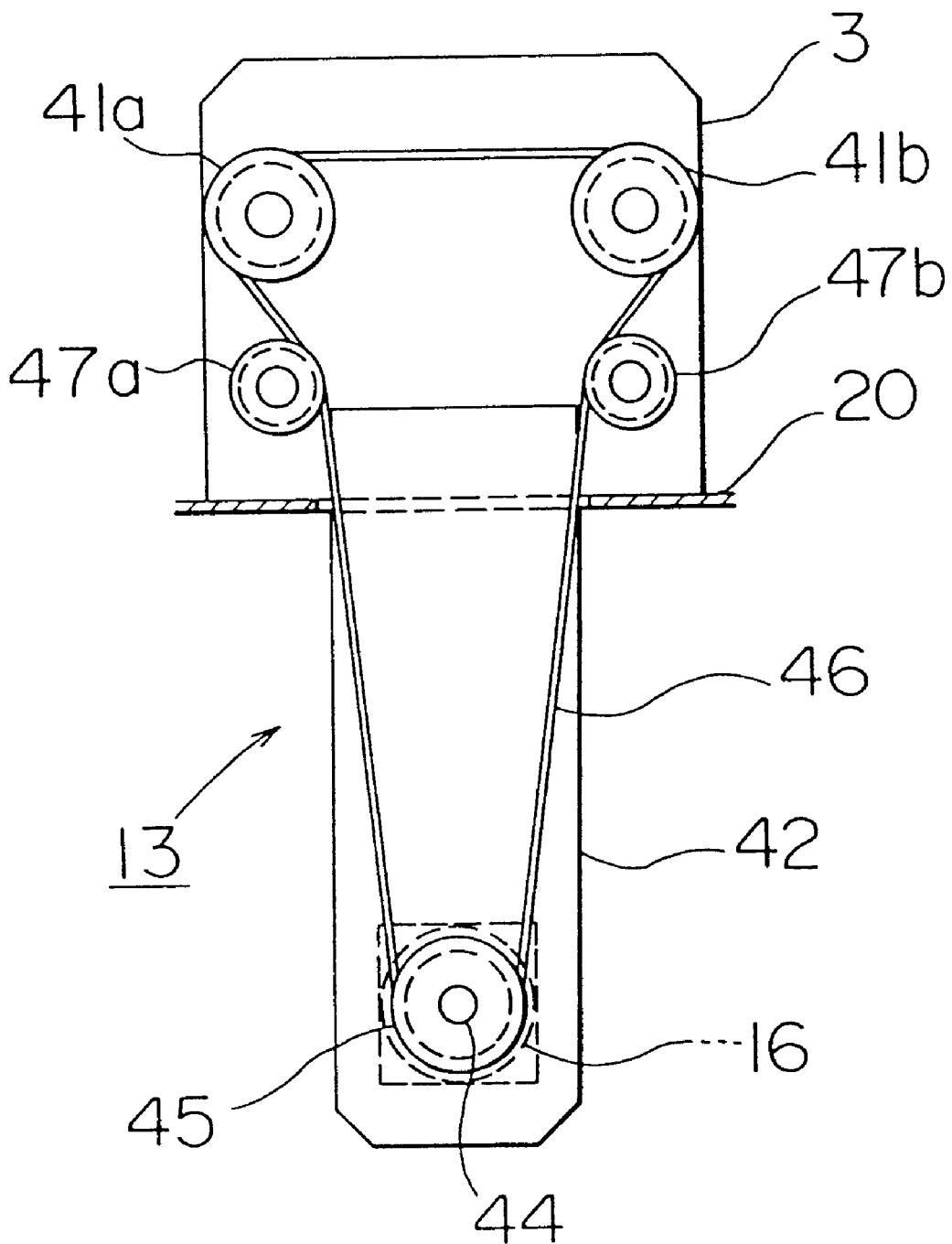
FIG. 3 is a rear view of an injection-apparatus reciprocation drive section of the injection molding machine shown in FIG. 1.

The injection molding machine 1 has a machine base 20. A back plate 3 standing upright is fixed onto the upper surface of the base 20 at one end portion thereof, and a mold attachment plate 2 standing upright is fixed onto the upper surface of the base 20 at an intermediate portion thereof. Therefore, the mold attachment plate 2 and the back plate 3 face each other. In FIGS. 1 and 2, components of a mold clamping apparatus, other than the mold attachment plate 2, are omitted. Further, paired main tie-bars 4a and 4b are disposed to extend between the mold attachment plate 2 and the back plate 3. The main tie-bars 4a and 4b support a front support plate 6 and a rear support plate 7, which are connected to each other by means of paired auxiliary tie-bars 5a and 5b, such that the front and rear support plates 6 and 7 can slide along the main tie-bars 4a and 4b. Moreover, the main tie-bars 4a and 4b and the auxiliary tie-bars 5a and 5b support an intermediate support block 8 such that the intermediate support block 8 can slide along the main tiebars 4a and 4b and the auxiliary tie-bars 5a and 5b. Thus, an injection apparatus support mechanism M is constructed.

Figure 4:
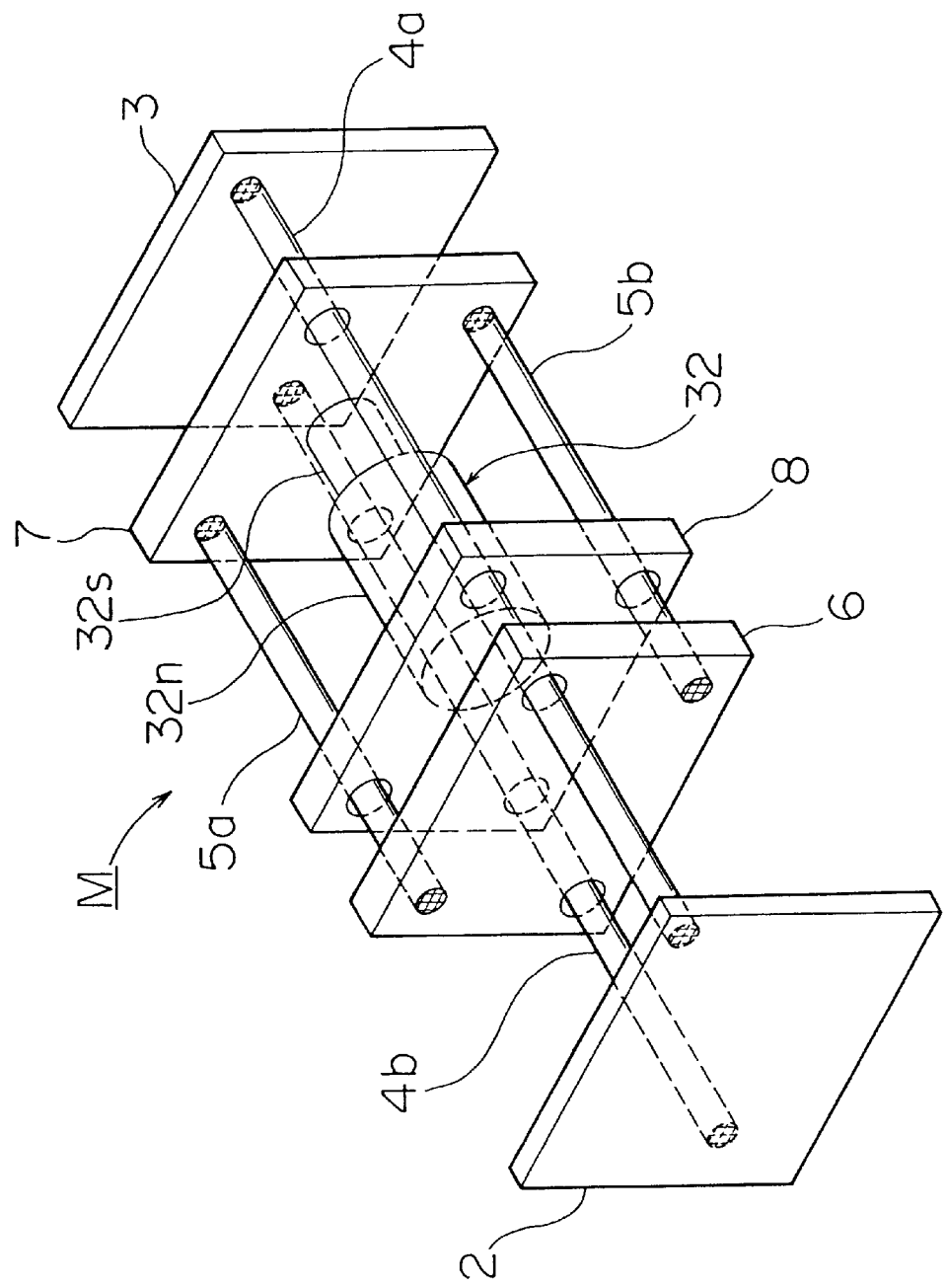
FIG. 4 is a schematic view showing the principle of an injection apparatus support mechanism of the injection molding machine shown in FIG. 1.

The structure of the injection apparatus support mechanism M is shown in FIG. 4, which schematically shows the principle thereof. The mold attachment plate 2, the back plate 3, the front support plate 6, the rear support plate 7, and the intermediate support block 8 each have a rectangular shape as viewed from the front. The main tie-bars 4a and 4b are disposed at symmetrical positions with respect to a screw 10, which will be described later, such that the main tie-bar 4a and 4b are located at opposite ends of one diagonal of each of the plates 2, 3, etc.; more specifically, at the upper-right corner and the lower-left corner of each of the plates 2, 3, etc., as viewed from the front (the side where the mold attachment plate 2 is present). Meanwhile, the auxiliary tie-bars 5a and 5b are disposed at symmetrical positions with respect to the screw 10 such that auxiliary tie-bars 5a and 5b are located at opposite ends of the other diagonal of each of the plates 2, 3, etc.; more specifically, at the upper-left corner and the lower-right corner of each of the plates 2, 3, etc., as viewed from the front. In FIG. 1, reference numeral 21 denotes a guide rail which is disposed on the upper surface of the machine base 20 to support (guide) the bottom of the front support plate 6.

The rear end of a heating barrel 9 is attached to the front support plate 6. An injection nozzle 22 is provided at the tip end of the barrel 9, and a hopper 23 is provided at a rear portion of the barrel 9 to be located on the upper side of the barrel 9. The injection nozzle 22 is caused to touch a stationary mold (not shown) provided on the mold attachment plate 2. In this state, melted resin is injected from the injection nozzle 22 and is charged into the cavity of the mold. The screw 10 is inserted into the interior of the barrel 9.

On the intermediate support block 8 is provided a screw rotation drive section 11 for rotating the screw 10 inserted into the barrel 9. As shown in FIG. 2, the intermediate support block 8 extends in the front/rear direction. A rotation shaft 24 is rotatably supported by a front portion of the intermediate support block 8 via a bearing 25. The rotation shaft 24 is disposed coaxially with the screw 10, and a front portion of the rotation shaft 24 projects frontward from the intermediate support block 8. Further, a driven pulley 26 is attached to the projected front portion of the rotation shaft 24, and the rear end of the screw 10 is coupled to the front end of the projected front portion. Moreover, the upper end of a motor support member 27 is fixed to the front end of the intermediate support block 8, and the lower portion of the motor support member 27 is extended to the interior of the machine base 20. A servomotor 28 for screw rotation is attached to the lower portion of the motor support member 27 located inside the machine base 20, and a drive pulley 30 is attached to a motor shaft 29 of the servomotor 28. Further, an endless timing belt 31 is wound around and extended between the drive pulley 30 and the driven pulley 26 to complete the screw rotation drive section 11.

A screw reciprocation drive section 12 for advancing and retracting the screw rotation drive section 11 is provided on the rear support plate 7. The rear support plate 7 rotatably supports a shaft portion of a screw portion 32s of a ball-screw mechanism 32 via bearings 33. A rear portion of the shaft portion is projected rearward from the rear support plate 7, and a driven pulley 34 is attached to the projected rear portion. Further, the screw portion 32a—which projects forward from the rear support plate 7—is in screw-engagement with a nut portion 32n, which is a component of the ball-screw mechanism 32 and is integrally provided at a rear portion of the intermediate support block 8. Moreover, the upper end of a motor support member 35 is fixed to the lower end of the rear support plate 7, and the lower portion of the motor support member 35 is extended to the interior of the machine base 20. A servomotor 36 for screw reciprocation is attached to the lower portion of the motor support member 35 located inside the machine base 20, and a drive pulley 38 is attached to a motor shaft 37 of the servomotor 36. Further, an endless timing belt 39 is wound around and extended between the drive pulley 38 and the driven pulley 34 to complete the screw reciprocation drive section 12. Thus is constructed the injection apparatus Mi supported by the front support plate 6, the intermediate support block 8, and the rear support plate 7.

An injection-apparatus reciprocation drive section 13 for advancing and retracting the rear support plate 7 is provided on the back plate 3. The injection-apparatus reciprocation drive section 13 comprises paired left and right ball-screw mechanisms 15a and 15b disposed to extend between the back plate 3 and the rear support plate 7, and a servomotor 16 for injection apparatus reciprocation, which rotates and drives the ball-screw mechanisms 15a and 15b. In the present embodiment, the ball-screw mechanisms 15a and 15b are disposed symmetrically with respect to the screw 10 (the injection nozzle 22). The shaft portions of the screw portions 15as and 15bs of the ball-screw mechanism 15a and 15b are rotatably supported via bearings 40a and 40b provided at the left and right ends of the back plate 3, and rear portions of the respective shaft portions are projected rearward from the back plate 3, and driven pulleys 41a and 41b are attached to the projected rear portions. Further, the screw portions 15as and 15bs—which project forward from the back plate 3—are in screw-engagement with nut portions 15an and 15bn, which are integrally provided at left and right ends of the rear support plate 7. Moreover, the upper end of a motor support member 42 is fixed to the back face of the back plate 3, and as shown in FIG. 1, the lower portion of the motor support member 42 is extended to the interior of the machine base 20. A servomotor 16 is attached to the lower portion of the motor support member 42 located inside the machine base 20, and a drive pulley 45 is attached to a motor shaft 44 of the servomotor 16. Further, an endless timing belt 46 is wound around and extended between the drive pulley 45 and the driven pulley 41a and 41b to complete the injection-apparatus reciprocation drive section 13. Reference numerals 47a and 47b denote rotatable idler pulleys which are attached to the motor support member 42 and are in contact with the outer surface of the timing belt 46 in order to guide the belt 46.

Next, the operation (function) of the injection machine 1 according to the embodiment will be described with reference to the drawings.

Through drive and control of the injection-apparatus reciprocation drive section 13, nozzle touch and nozzle release operations are performed. In these operations, since the screw portions 15as and 15bs of the ball-screw mechanisms 15a and 15b are rotated upon rotation of the servomotor 16 for injection apparatus reciprocation, the rear support plate 7—by which the nut portions 15an and 15bn are integrally supported—advances and retracts along the axis of screw 10. Since the front and rear support plates 6 and 7 are integrally attached to each other via the auxiliary tie-bars 5a and 5b, the entirety of the injection apparatus Mi supported by the front and rear support plate 6 and 7 advances and retracts accordingly. When the injection apparatus Mi advances, the injection nozzle 22 advances to a position indicated by a phantom line in FIG. 2 and touches a stationary mold (not shown) attached to the mold attachment plate 2, thereby enabling injection and charge of melted resin into the cavity of the mold. When the injection apparatus Mi retracts, the injection nozzle 22 is released from the stationary mold.

During molding operation, a molding material is supplied from the hopper 23 to the interior of the barrel 9, and during measurement, the molding material is plasticized (melted) through drive and control of the screw rotation drive section 11. In this case, the screw 10 is rotated upon rotation of the servomotor 28 for screw rotation, and the screw 10 and the intermediate support block 8 are retracted through back-pressure control of the screw reciprocation drive section 12. The back pressure is controlled on the basis of pressure detected by means of a load cell (pressure sensor) attached to the bearing 25. After completion of the measurement step, the screw reciprocation drive section 12 is driven and controlled, so that the measured resin is injected and charged into the cavity of the mold. In this case, upon rotation of the servomotor 36 for screw reciprocation, the screw portion 32s of the ball-screw mechanism 32 rotates, so that the intermediate support block 8, on which the nut portion 32n is integrally formed, and the screw 10 advance at a preset injection speed.

As described above, in the injection molding machine 1 according to the embodiment, since the mold attachment plate 2 and the back plate 3 are supported by the paired main tie-bars 4a and 4b disposed symmetrically with respect to the screw 10, a sufficient level of mechanical strength (fixation strength) is secured for the mold attachment plate 2 and the back plate 3. In addition, since the front support plate 6 and the rear support plate 7 are connected to each other by the paired auxiliary tie-bars 5a and 5b disposed symmetrically with respect to the screw 10 at positions different from those of the main tie-bars 4a and 4b, the mechanical strength of these plates is secured. Accordingly, inclination of the mold attachment plate 2 and the injection apparatus Mi—which is a problem involved in conventional injection molding machines—is prevented, so that the durability of the entire injection apparatus Mi is improved, and occurrence of a malfunction is prevented.

Since the main tie-bars 4a and 4b support (guide) the front and rear support plates 6 and 7, the main tie-bars 4a and 4b provide a support function and a guide function for the front and rear support plates 6 and 7. In addition, since the main tie-bars 4a and 4b and the auxiliary tie-bars 5a and 5b support (guide) the intermediate support block 8, the main tie-bars 4a and 4b and the auxiliary tie-bars 5a and 5b provide a support function and a guide function for the intermediate support block 8. As described, since each of the main tie-bars 4a and 4b and the auxiliary tie-bars 5a and 5b provides a plurality of functions, costs can be reduced.

The injection-apparatus reciprocation drive section 13 is provided on the back plate 3; comprises the paired ball-screw mechanisms 15a and 15b disposed symmetrically with respect to the screw 10, as well as the servomotor 16 for rotating the ball-screw mechanisms 15a and 15b; and is adapted to advance and retract the rear support plate 7. Therefore, a reaction force generated during nozzle touch operation acts on the back plate 3 in a direction perpendicular thereto, so that no excessive stresses act on the mold attachment plate 2 and the injection apparatus. Accordingly, there can be eliminate an additional cost, which would otherwise be required to secure sufficient mechanical strength of a mechanism for fixing or supporting the mold attachment plate 2 and the injection apparatus.

The present invention is not limited to the above-described embodiments. Regarding structural details, shape, material, number of elements, method, and the like, modifications and any omission or addition may be possible as needed without departing from the scope of the invention. For example, in the embodiments, the injection-apparatus reciprocation drive section 13 uses the ball-screw mechanisms 15a and 15b. However, the ball-screw mechanisms 15a and 15b may be replaced with any other mechanism that provides the same function. Further, although the illustrated injection molding machine is of a motor-driven type, the present invention can be applied to injection molding machines of other types, such as a hydraulic-type injection molding machine.

What is claimed is:

1. An injection molding machine comprising an injection apparatus support mechanism which comprises at least one main tie-bar disposed to extend between a mold attachment plate and a back plate disposed to face each other; front and rear support plates connected to each other via at least one auxiliary tie-bar and slidably supported by said main tie-bar; and an intermediate support block slidably supported by said main tie-bar and said auxiliary tie-bar, and in which a barrel is provided on said front support plate; a screw rotation drive section for rotating a screw inserted into said barrel is provided on said intermediate support block; a screw reciprocation drive section for advancing and retracting said screw rotation drive section is provided on said rear support plate; and an injection-apparatus reciprocation drive section for advancing and retracting said rear support plate is provided on said back plate.

2. An injection molding machine according to claim 1, wherein a pair of said main tie-bars are disposed symmetrically with respect to said screw, and a pair of said auxiliary tie-bars are disposed symmetrically with respect to said screw at positions different from those of said main tie-bars.

3. An injection molding machine according to claim 1, wherein said injection-apparatus reciprocation drive section comprises a ball-screw mechanism disposed between said back plate and said rear support plate, and a servomotor for rotating and driving said ball-screw mechanism.

4. An injection molding machine according to claim 3, wherein a pair of said ball-screw mechanisms are disposed symmetrically with respect to said screw.

5. An injection molding machine according to claim 1, wherein the bottom of said front support plate is supported by a guide rail disposed on the upper surface of a machine base.

6. An injection molding machine according to claim 1, wherein said screw rotation drive section comprises a rotation shaft rotatably supported by said intermediate support block and having a front end to which the rear end of said screw is coupled, and a servomotor for rotating and driving said rotation shaft.

7. An injection molding machine according to claim 1, wherein said screw reciprocation drive section comprises a ball-screw mechanism disposed between said intermediate support block and said rear support plate, and a servomotor for rotating and driving said ball-screw mechanism.

* * * * *